(12) United States Patent
Barnes

(10) Patent No.: US 11,420,765 B2
(45) Date of Patent: Aug. 23, 2022

(54) AIRCRAFT FUSELAGE WITH INTERNAL CURRENT RETURN NETWORK

(71) Applicant: Aerion Intellectual Property Management Corporation, Palo Alto, CA (US)

(72) Inventor: Edward Barnes, Palo Alto, CA (US)

(73) Assignee: Aerion Intellectual Property Management Corporation, Palo Alto, CA (US)

( * ) Notice: Subject to any disclaimer, the term of this patent is extended or adjusted under 35 U.S.C. 154(b) by 350 days.

(21) Appl. No.: 16/830,866

(22) Filed: Mar. 26, 2020

(65) Prior Publication Data

US 2021/0300588 A1 Sep. 30, 2021

(51) Int. Cl.
*B64D 45/02* (2006.01)
*B32B 15/20* (2006.01)
*B32B 15/08* (2006.01)

(52) U.S. Cl.
CPC .............. *B64D 45/02* (2013.01); *B32B 15/20* (2013.01); *B32B 15/08* (2013.01); *B32B 2605/18* (2013.01)

(58) Field of Classification Search
CPC ........ B64D 45/02; H02G 13/00; H02G 13/80; C23C 4/12; B64C 1/12; B32B 15/20; B32B 15/08; B32B 2605/18

USPC ......................................................... 361/218
See application file for complete search history.

(56) References Cited

U.S. PATENT DOCUMENTS

2013/0034705 A1* 2/2013 Matsen ................... B32B 15/08
156/60
2013/0099772 A1* 4/2013 Van Deventer ...... G01R 31/008
324/72

* cited by examiner

*Primary Examiner* — Danny Nguyen
(74) *Attorney, Agent, or Firm* — Hovey Williams LLP

(57) ABSTRACT

A lightning strike protection (LSP) system minimizes or eliminates both the direct and indirect effects of lightning strikes on aircraft with composite fuselages without adding excessive weight to the aircraft. The LSP system comprises an external current return network and an internal current return network. The internal current return network comprises a wide plane of conductive foil material adhered to, or embedded within, an innermost surface of the fuselage and other portions of the aircraft formed primarily of composite materials. The conductive foil material is provided in wide planar sheets, and in one embodiment, is formed of expanded copper foil mesh. The internal current return network is installed in all areas or zones of the aircraft where cables and wires are routed.

17 Claims, 5 Drawing Sheets

AIRCRAFT FUSELAGE WITH INTERNAL CURRENT RETURN NETWORK

BACKGROUND

Commercial aircraft are struck by lightning more than once per year on average. Such strikes typically occur during the climb and descent phases of flight while an aircraft is in heavily charged regions of clouds. A typical aircraft at cruising speed flies further than its own length in the time it takes a lightning strike to begin and end, so a lightning bolt may initially strike a forward portion of the aircraft and reattach itself to several portions of the aircraft before it exits the tail or other rear portion of the aircraft.

A single bolt of lightning can contain the equivalent of 200,000 amps of electricity that seeks the path of least electrical resistance through an unprotected aircraft, causing burns on exterior surfaces of the aircraft, melted components, and other structural damage (direct effects) that can compromise the aircraft's structural integrity and transient voltages and induced magnetic fields that interfere with data and signal cables and damage and even destroy onboard electronics (indirect effects).

Aircraft with highly conductive aluminum fuselages quickly conduct away current from lightning strikes and therefore rarely suffer significant direct effects from lightning. Aluminum fuselages also protect against the entrance of electromagnetic energy into cabling and electronic components and therefore don't experience significant indirect effects either.

But newer lightweight aircraft built primarily of less conductive composite materials do not readily conduct away electrical currents and shield cabling and electronic components from electromagnetic forces and therefore require lightning strike protection (LSP) systems. Such LSP systems often include conductive components applied to or embedded in the exterior of an aircraft's fuselage to create electrically conductive paths on the exterior surfaces of the aircraft. For alleviating indirect effects of lightning, LSP systems may include conductive cables, metal rods, and electrically conductive brackets placed near internal wiring and cabling to create internal current return paths and for grounding and shielding the wires and cables. Unfortunately, these internal components add undesired weight to aircraft, thus reducing the aircraft's efficiency and range, and occupy valuable space in the aircraft that could be used for other purposes.

SUMMARY

The present invention solves at least some of the above-described problems and other related problems by providing an improved lightning strike protection (LSP) system for aircraft with fuselages and/or other components formed primarily of composite materials. The LSP system minimizes or eliminates both the direct and indirect effects of lightning strikes on the aircraft and reduces AC resistivity without adding excessive weight to the aircraft and without occupying valuable space within the aircraft.

An embodiment of the LSP is installed in an aircraft having a fuselage formed at least partially of composite panels attached to frames, stringers, and/or other structures. The aircraft further includes power cabling and data and signal wires that run along interior surfaces of the fuselage and elsewhere inside the aircraft.

The LSP system of the present invention broadly comprises an external current return network and an internal current return network. The external current return network provides a low impedance path on or in the exterior of the aircraft for directing lightning currents through and out of the aircraft. The external current return network also protects components internal to the aircraft from direct lightning strikes. In one embodiment, the external current return network comprises a conductive foil material adhered to, or embedded within, the outer surface of the fuselage.

The internal current return network provides a low impedance path on or in the innermost surface of the aircraft fuselage and elsewhere inside the aircraft to provide a parallel path for lightning currents. The internal current return network also eliminates electromagnetic interference with data and signal cables and provides a continuous zero voltage reference plane throughout the aircraft.

The internal current return network comprises a wide plane of conductive foil material adhered to, or embedded within, an innermost surface of the fuselage and other portions of the aircraft formed primarily of composite materials. The conductive foil material is provided in wide planar sheets, and in one embodiment, is formed of expanded copper foil mesh.

The internal current return network is preferably installed in all areas or zones of the aircraft where cables and wires are routed so that cables and wires may be routed in a path on or directly adjacent to the internal current return network. Routing the cables close to the current return network plane reduces the voltages and currents induced on the cables caused by lightning, radio interference, crosstalk and other electromagnetic phenomena. In some embodiments, separate sheets of the wide plane conductive foil material are applied to different areas or zones within the aircraft, and the multiple separate sheets are interconnected by interconnecting sheets or strips of the conductive foil material or other electrical conductors.

The internal current return network is also electrically connected to the external current return network in as many locations as possible. At a minimum, the internal current return network in each section or area of the aircraft is connected to the external current return network using two low impedance connections at least every 3 meters.

One particular embodiment of the internal current return network comprises a first wide planar layer of electrically conductive foil placed over a first interior surface of the fuselage near a front portion of the aircraft. The first wide planar layer of electrically conductive foil covers interior surfaces of some of the panels, frames, and stringers of the fuselage and is placed alongside or underneath power cabling and data and signal wires. The internal current network further comprises at least a second wide planar layer of electrically conductive foil placed over a second interior surface of the fuselage near a rear portion of the aircraft. As with the first wide planar layer, the second wide planar layer of electrically conductive foil covers interior surfaces of some of the panels, frames, and stringers of the fuselage and is placed alongside or underneath power cabling and data and signal wires. The current network further comprises an interconnecting layer or strip of electrically conductive foil that connects the first wide planar layer of electrically conductive foil with the second wide planar layer of electrically conductive foil to create a continuous current return network between the front portion of the aircraft and the rear portion of the aircraft. Other embodiments of the internal current return network can be installed in the wings of an aircraft or any portion of an aircraft formed primarily of low conductive materials.

Constructing the internal current return network with wide planes of expanded metal foil rather than metal rods, cables or brackets significantly increases the surface area of the current return network for a given weight. Increasing the surface area allows the internal current return network to more effectively and efficiently provide a safe conductive path for lightning currents. Lightning is often composed of very high frequency electricity. At very high frequencies, the current in a conductor is carried almost exclusively on the conductor's exterior surface. By using a thin, wide, planar material as the current return network, a much larger conductive surface area is available to carry high frequency lightning currents without wasting weight on thicker, heavier conductors that carry little to no current in their interior portions.

Another embodiment of the invention includes a method of creating the above-described internal current return network and similar internal current return networks in an aircraft. The method comprises applying a first wide planar layer of electrically conductive foil over a first interior surface of the aircraft adjacent data and signal wires and near a front portion of the aircraft. The method further comprises applying a second wide planar layer of electrically conductive foil over a second interior surface of the aircraft adjacent data and signal wires and near a rear portion of the aircraft. The method further comprises electrically connecting the first wide planar layer of electrically conductive foil with the second wide planar layer of electrically conductive foil to create a continuous internal current return network between the front portion and the rear portion of the aircraft. The method further comprises electrically connecting the continuous internal current return network to an external current return network so as to create parallel current return networks on the outside and inside of the aircraft's fuselage.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

DETAILED DESCRIPTION

Figure 1:
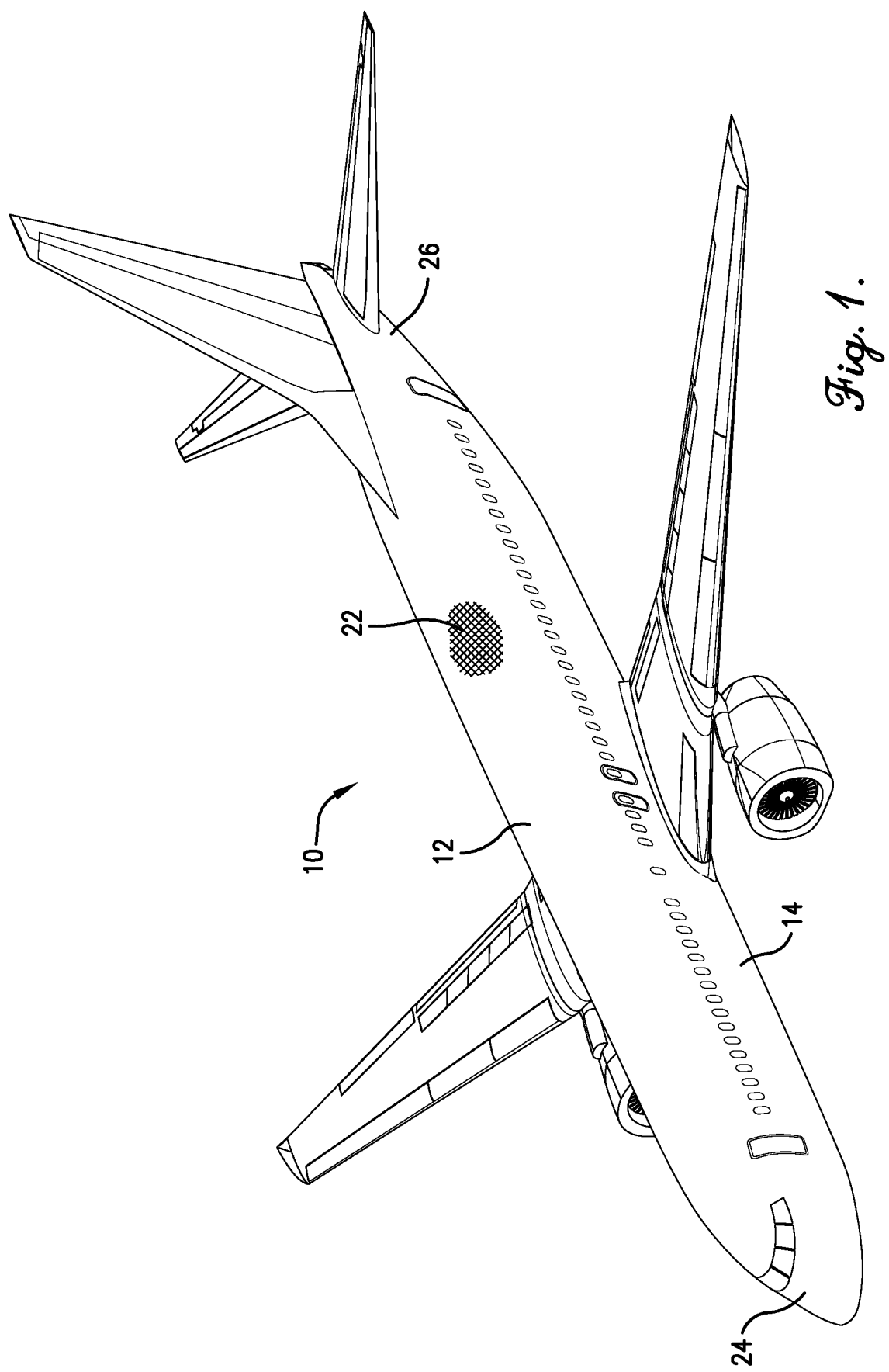
FIG. 1 is an isometric view of an exemplary aircraft in which embodiments of the LSP system of the present invention may be incorporated.
Figure 2:
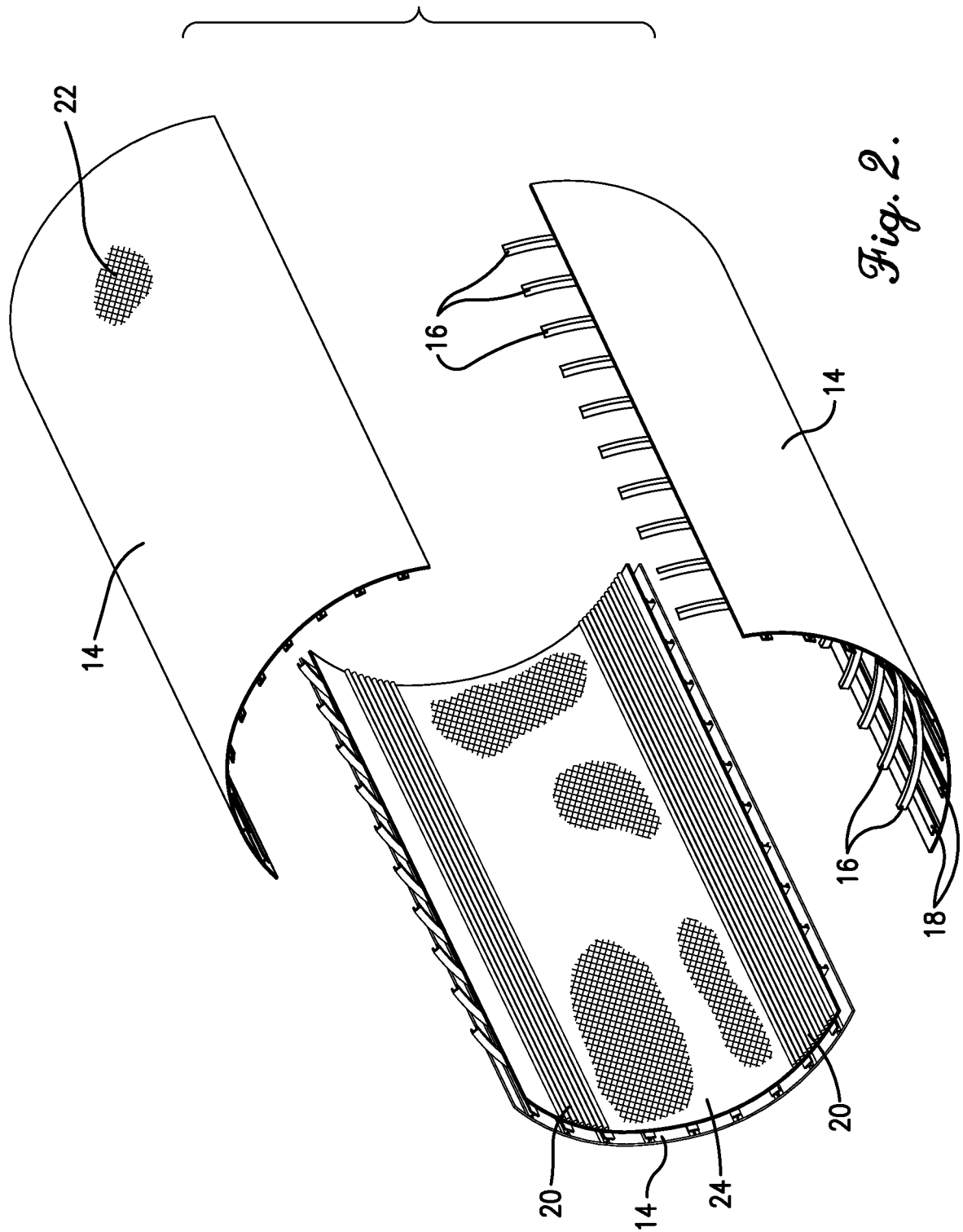
FIG. 2 is an exploded isometric view of a portion of the fuselage of the aircraft in FIG. 1 showing details of the LSP system.
Figure 3:
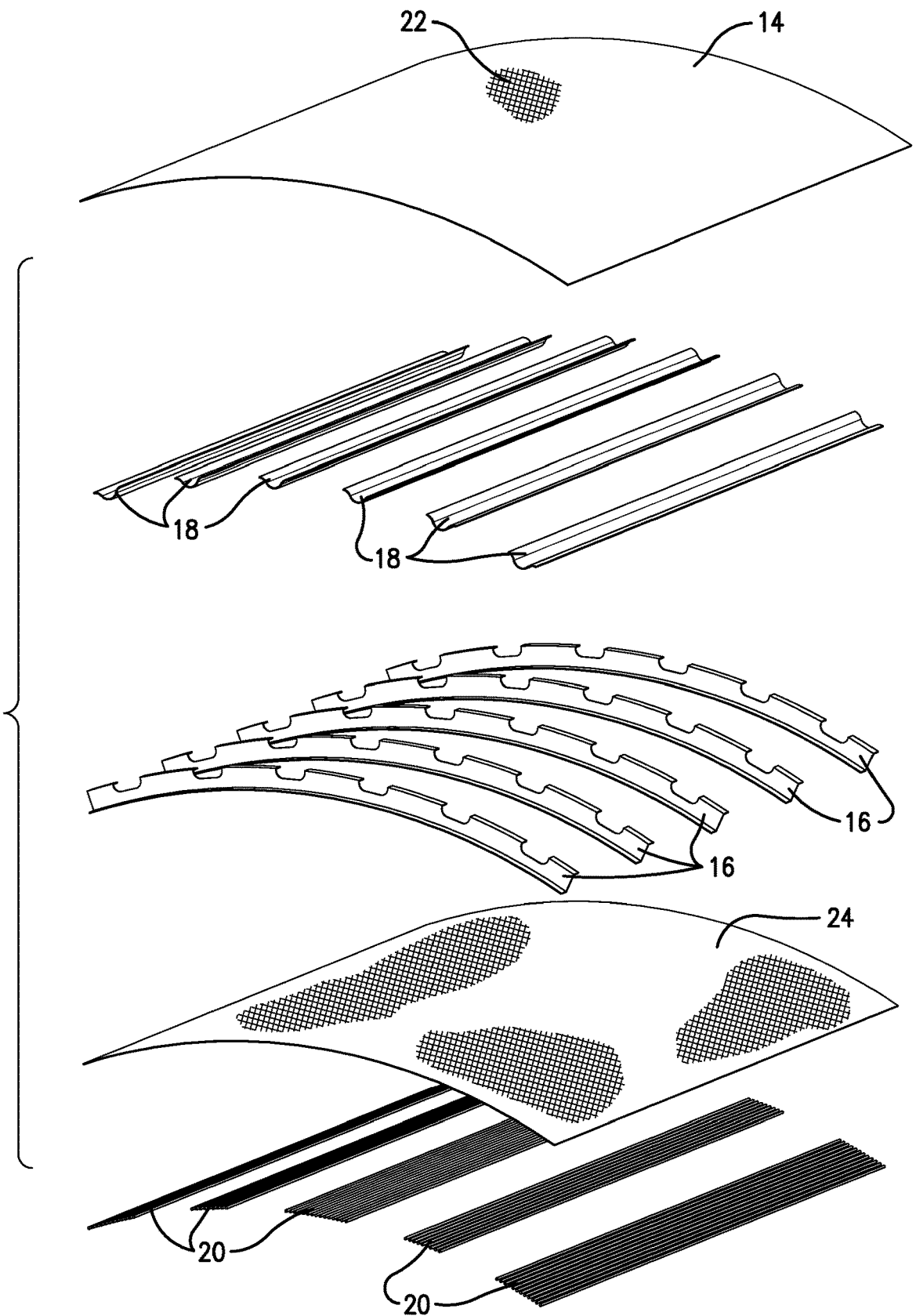
FIG. 3 is an exploded view of one fuselage panel of the aircraft along with corresponding frames, stringers, and a portion of the LSP system.

Turning now to the drawing figures, and initially FIG. 1, an exemplary aircraft 10 in which a lightning strike protection (LSP) system constructed in accordance with embodiments of the invention may be implemented is shown. The aircraft may be any size and type of aircraft including a commercial jet, a business jet, a personal jet, or any similar plane. As used throughout this application, the term "aircraft" includes any jet, airplane, helicopter, flying car, rocket, missile, drone or other vehicle capable of becoming airborne. As shown in FIGS. 1, 2 and 3, an embodiment of the aircraft 10 has a fuselage 12 formed at least partially of composite panels 14 attached to frames 16, stringers 18, and/or other structural components. The aircraft further includes power cabling and data and signal wires 20 that run along interior surfaces of the fuselage 12 and elsewhere inside the aircraft 10.

The LSP system of the present invention minimizes both direct and indirect effects of lightning strikes on the aircraft 10 without adding excessive weight to the aircraft and occupying valuable space within the aircraft. The LSP system broadly comprises an exterior current return network attached to or embedded within an exterior surface of the aircraft fuselage and an internal current return network attached to or embedded within an interior surface of the fuselage.

The exterior and interior current return networks together provide parallel, high conductivity current paths for reducing structural voltage drops along likely lightning paths through the aircraft, thus reducing resistive voltages on cables, wires, pipes, and other components inside the aircraft. The exterior and interior current return networks also reduce electromagnetic interference with data and signal cables inside the aircraft and provide a continuous zero voltage reference plane throughout the aircraft. Embodiments of both the exterior and interior current return networks will now be described in more detail.

In one embodiment, the external current return network comprises a conductive foil material 22 adhered to, or embedded within, the outer surface of the fuselage 12 and other exterior portions of the aircraft formed primarily of composite materials. The conductive foil material 22 may be applied to the exterior of the aircraft and then partially or fully covered with an additional layer of composite material, paint, or other coatings. The conductive foil material 22 is provided in wide planar sheets, and in one embodiment, is expanded copper foil such as Dexmet expanded metal foil 3CU7-100A. The exemplary metal foil is formed of annealed copper with 7 mils strand widths and 5 mils thickness. The expanded foil is approximately 0.127 mm thick, has an open area of 70%, and a weight of 195.3 grams/m$^2$. The external current return network may also be formed of other thin, wide plane, highly conductive materials. Thickness, strand widths, etc. may vary depending on the amount of current required to be carried in various areas of the aircraft. Type of metal may be selected based current carrying capacity, weight, cost and corrosion considerations.

The internal current return network provides a low impedance path inside the aircraft fuselage for lightning currents to minimize the voltage drop between circuits, components, and line replaceable units that require bonding to a zero-volt reference. The internal current return network also reduces electromagnetic interference with the data and signal cables 20 and provides a continuous zero voltage reference plane between a front portion 24 and a rear portion 26 of the aircraft. The internal current return network also reduces voltage drops for 115 VAC and 28 VDC power systems in the aircraft, ensures stray currents will trip circuit break protection components quickly, provides a low resistance path between exposed metal parts and structure to prevent personnel shock hazards, provides a low impedance return current path for intended and unintended common mode signals to reduce radiated emissions and improve radio frequency and transient susceptibility, provides appropriate zero-volt reference for transmit and receive antennas, and provides adequate bonding for static discharge considerations.

Referring to FIGS. 2 and 3, an embodiment of the internal current return network comprises a conductive foil material 24 adhered to, or embedded within, the innermost surface of the fuselage 12 and other portions of the aircraft formed primarily of composite materials. The conductive foil material 24 is provided in wide planar sheets, and in one embodiment, is expanded copper foil such as Dexmet expanded metal foil 3CU7-100A. The exemplary metal foil is formed of annealed copper with 7 mils strand widths and 5 mils thickness. The expanded foil is approximately 0.127 mm thick, has an open area of 70%, and a weight of 195.3 grams/m$^2$. The external current return network may also be formed of other thin, wide plane, highly conductive materials. Thickness, strand widths, etc. may vary depending on the amount of current required to be carried in various areas of the aircraft. Type of metal may be selected based current carrying capacity, weight, cost and corrosion considerations.

Constructing the internal current return network with wide planes of expanded metal foil rather than metal rods, cables or brackets significantly increases the surface area of the current return network for a given weight. Increasing the surface area allows the internal current return network to more effectively and efficiently provide a safe conductive path for lightning currents.

Figure 6:
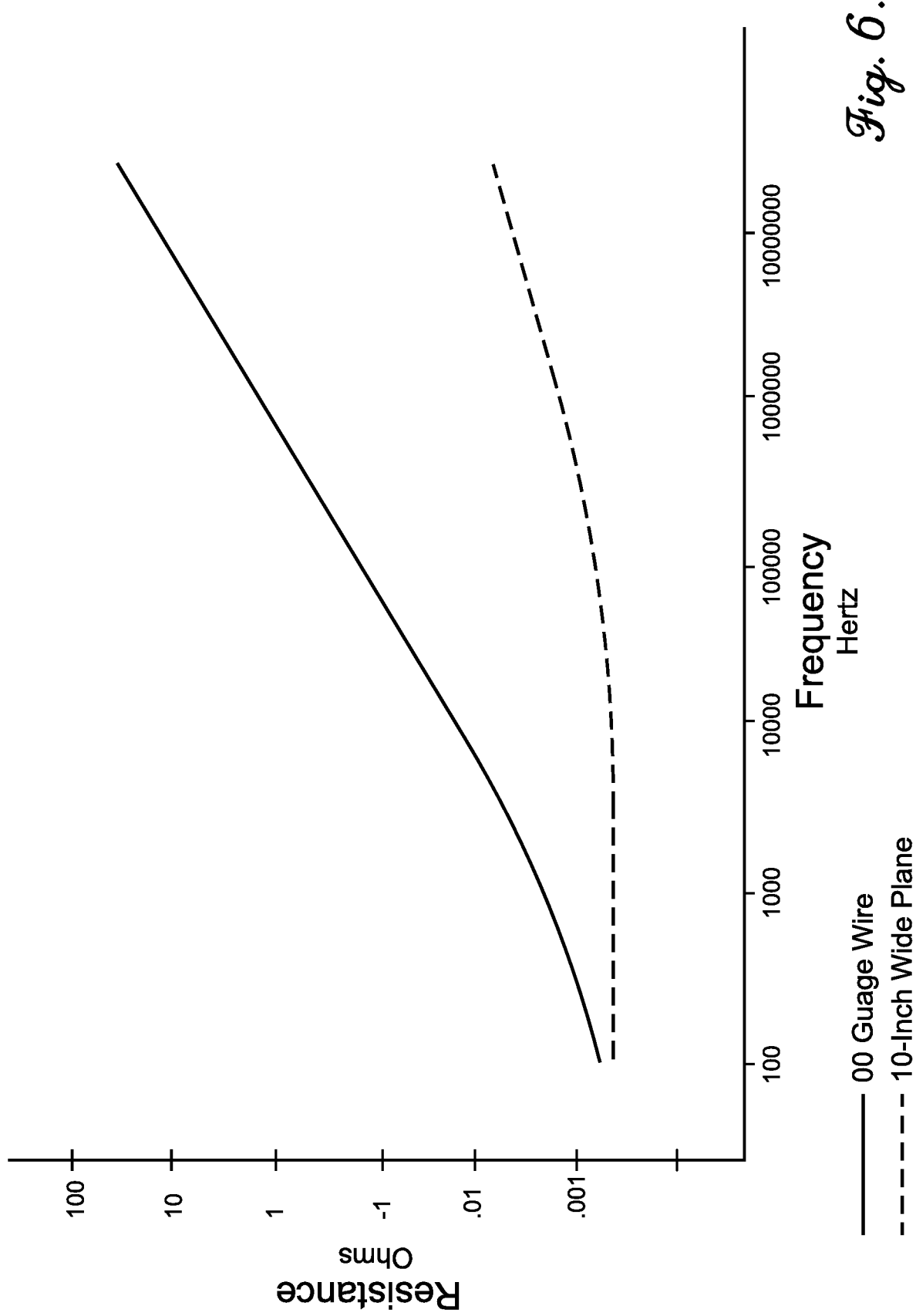
FIG. 6 is a graph comparing the AC resistance of a conventional wire to a wide plane of copper foil as used in the present invention The drawing figures do not limit the present invention to the specific embodiments disclosed and described herein. The drawings are not necessarily to scale, emphasis instead being placed upon clearly illustrating the principles of the invention.

FIG. 6 shows a log/log chart plotting AC resistance in ohms vs. Frequency in Hz. The graph shows the AC Resistance of a 1 meter length of 00 gauge wire that is commonly used for a current return path in prior art aircraft. It also shows the AC resistance of a 10-inch wide plane of 1 meter length set to a thickness of 10 mils (same cross-sectional area of material and thus the same weight) as could be used in the present invention. For the same weight of conductive metal, the AC resistance in the wide plane copper foil is reduced substantially, especially as frequency increases. This results in a proportional decrease of structural voltages on cables during lightning events and significantly reduces other forms of electromagnetic interference.

The internal current return network is preferably established in all areas or zones of the aircraft where cables and wires 20 are routed so that cables and wires 20 may be routed in a path continuously 5 cm or less directly adjacent to the current return network. Keeping the cables and wires close to the current return network reduces the loop area where both high intensity radiated fields (HIRF) and lightning induced magnetic and electric fields couple onto the wires and cables. It also narrows the dispersion of the return current path beneath the cable resulting in reduced crosstalk on the return plane.

Figure 4:
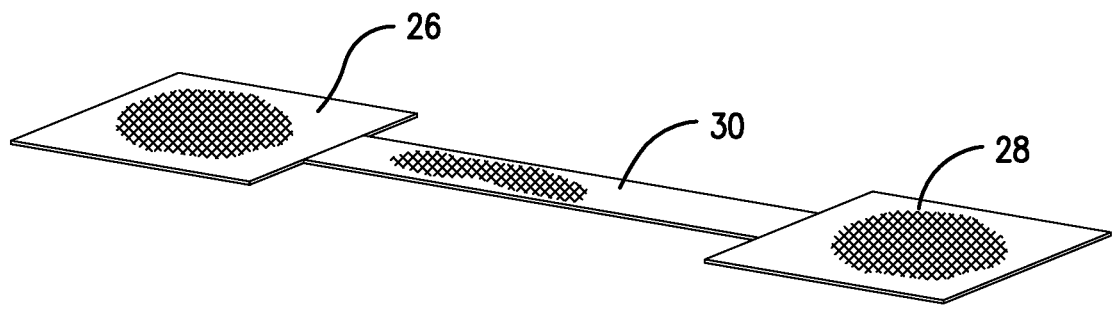
FIG. 4 is a schematic representation of an embodiment of the internal current return network of the LSP system.

A specific exemplary embodiment of the internal current return network is illustrated schematically in FIG. 4 and comprises at least a first wide planar layer 28 of electrically conductive foil placed over a first interior surface of the fuselage near a front portion of the aircraft. In one embodiment, the first interior surface is in the nose of the aircraft. The first wide planar layer 26 of electrically conductive foil covers interior surfaces of some of the panels, frames, stringers, and other structures under or adjacent power cabling and the data and signal wires. The current network further comprises at least a second wide planar layer 28 of electrically conductive foil placed over a second interior surface of the fuselage near a rear portion of the aircraft. In one embodiment, the second interior surface is in the tail of the aircraft. As with the first wide planar layer 26, the second wide planar layer 28 of electrically conductive foil covers interior surfaces of some of the panels, frames, stringers, and other structures under or adjacent power cabling and data and signal wires. The current network further comprises an interconnecting wide planar layer 30 of electrically conductive foil that connects the first wide planar layer of electrically conductive foil with the second wide planar layer of electrically conductive foil to create a continuous current return network between the front portion of the aircraft and the rear portion of the aircraft. In one embodiment, the interconnecting layer is applied through the fuselage of the aircraft. Other embodiments of the internal current return network can be installed in the wings of an aircraft or any portion of an aircraft formed primarily of low conductive materials.

As mentioned above, the internal current return network is preferably installed in all areas or zones of the aircraft where cables and wires are routed so that cables and wires may be routed in a path on or directly adjacent to the internal current return network. In some embodiments, separate sheets of the wide plane conductive foil material are applied to different areas or zones within the aircraft, and the multiple separate sheets are interconnected by interconnecting sheets of the conductive foil material or other electrical conductors.

The internal current return network is also connected to the external current return network in as many locations as possible. As a minimum, the internal current return network in each section of the aircraft is connected to the external current return network using two low impedance connections every 3 meters. With such connections, the internal current return network provides a parallel current path for lightning strikes while providing a low impedance return current path for wires and cables routed from front to back of the fuselage.

Figure 5:
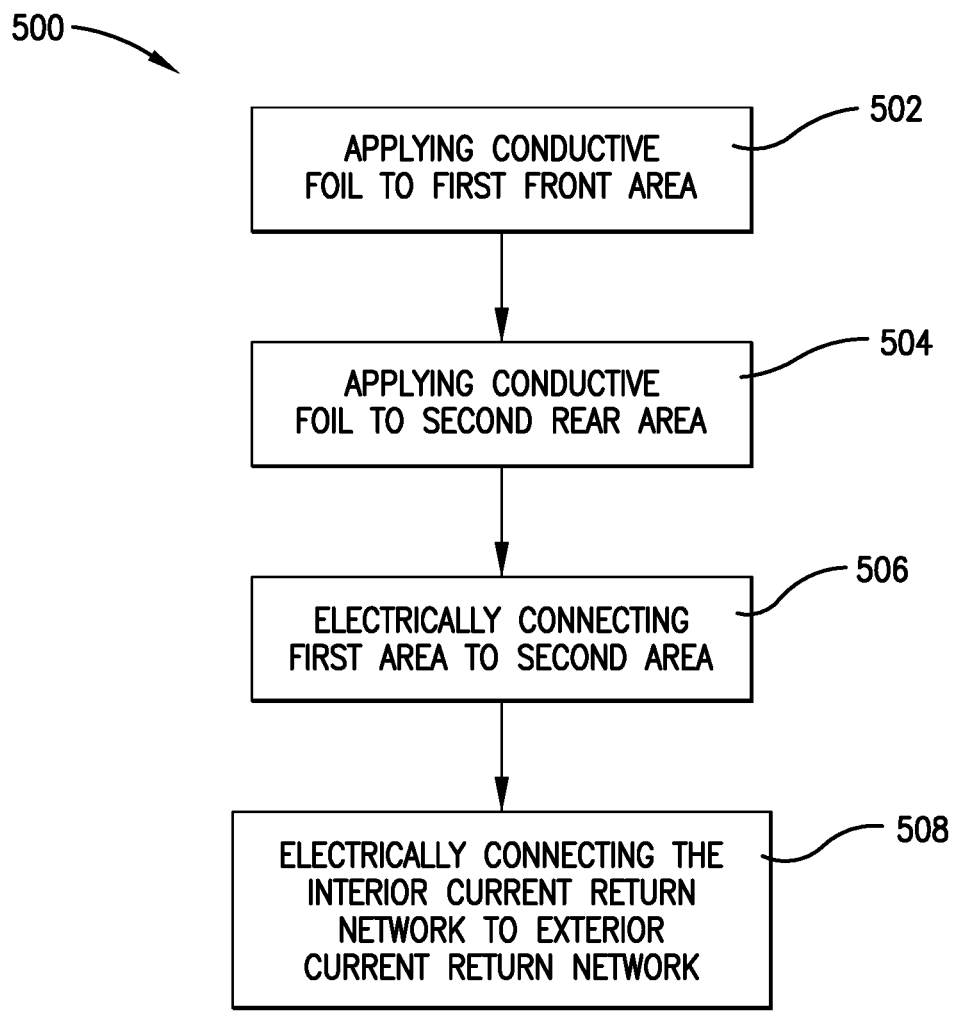
FIG. 5 is a flow diagram depicting exemplary steps in a method of the invention.

Another embodiment of the invention includes methods of creating the above described internal current return network and similar embodiments of internal current return networks in an aircraft. The flow chart of FIG. 5 shows exemplary steps in an exemplary method 500. In some alternative implementations, the steeps or functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved.

The method 500 comprises applying a first layer of electrically conductive foil over a first interior surface of the aircraft adjacent data and signal wires and near a front portion of the aircraft as depicted in step 502. The method further comprises applying a second layer of electrically conductive foil over a second interior surface of the aircraft adjacent data and signal wires and near a rear portion of the aircraft as depicted in step 504. The method still further comprises electrically connecting the first layer of electrically conductive foil with the second layer of electrically conductive foil to create a continuous current return network between the front portion and the rear portion of the aircraft as depicted in step 506. The method further comprises electrically connecting the continuous internal current return network to an external current return network so as to create parallel current return networks on the outside and inside of the aircraft's fuselage as depicted in step 5080. The above steps are preferably repeated to apply layers of electrically conductive foil to all areas or zones of the aircraft where cables and wires are routed and to electrically connect all the layers so that all cables and wires may be routed in a path continuously 5 cm or less directly adjacent to the continuous internal current return network. At least some of the layers are more than 2 m$^2$ in area and may be as large as 50 m$^2$ in area.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method of creating an internal current return network in an aircraft, the method comprising:
    applying a first wide planar layer of electrically conductive foil over a first interior surface of the aircraft adjacent data and signal wires and near a front portion of the aircraft;
    applying a second wide planar layer of electrically conductive foil over a second interior surface of the aircraft adjacent data and signal wires and near a rear portion of the aircraft; and
    electrically connecting the first wide planar layer of electrically conductive foil with the second wide planar layer of electrically conductive foil to establish the internal current return network in an electrically continuous manner between the front portion of the aircraft and the rear portion of the aircraft.

2. The method as set forth in claim 1, further comprising:
    applying a layer of insulative material over the first wide planar layer of electrically conductive foil; and
    applying a layer of insulative material over the second wide planar layer of electrically conductive foil.

3. The method as set forth in claim 1, wherein the electrically connecting step comprises connecting the first wide planar layer of electrically conductive foil to the second wide planar layer of electrically conductive foil with an interconnecting layer of electrically conductive foil.

4. The method as set forth in claim 3, further comprising applying a layer of insulative material over the interconnecting layer of electrically conductive foil.

5. The method as set forth in claim 1, wherein the first wide planar layer of electrically conductive foil and the second wide planar layer of electrically conductive foil are formed of expanded copper foil material.

6. The method as set forth in claim 1, wherein the first interior surface of the aircraft and the second interior surface of the aircraft are formed of composite materials.

7. The method as set forth in claim 1, wherein surface areas of the first wide planar layer of electrically conductive foil and the second wide planar layer of electrically conductive foil are greater than 2 m$^2$.

8. The method as set forth in claim 1, further comprising:
    applying a third wide planar layer of electrically conductive foil over a third interior surface of the aircraft adjacent data and signal wires and between the front portion of the aircraft and the rear portion of the aircraft; and
    electrically connecting the third wide planar layer of electrically conductive foil between the first wide planar layer of electrically conductive foil and the second wide planar layer of electrically conductive foil.

9. The method as set forth in claim 8, further comprising applying a layer of insulative material over the third wide planar layer of electrically conductive foil.

10. A method of creating an internal current return network in an aircraft, the method comprising:

applying a first wide planar layer of electrically conductive foil having a surface area of at least 2 m² over a first interior surface of the aircraft adjacent data and signal wires and near a nose portion of the aircraft;

applying a layer of insulative material over the first wide planar layer of electrically conductive foil;

applying a second wide planar layer of electrically conductive foil having a surface area of at least 2 m² over a second interior surface of the aircraft adjacent data and signal wires and near a tail portion of the aircraft;

applying a layer of insulative material over the second wide planar layer of electrically conductive foil; and electrically connecting the first wide planar layer of electrically conductive foil with the second wide planar layer of electrically conductive foil to create the internal current return network electrically continuously between the nose portion of the aircraft and the tail portion of the aircraft.

11. The method as set forth in claim 10, wherein the electrically connecting step comprises connecting the first wide planar layer of electrically conductive foil to the second wide planar layer of electrically conductive foil with an interconnecting layer of electrically conductive foil.

12. The method as set forth in claim 11, further comprising applying a layer of insulative material over the interconnecting layer of electrically conductive foil.

13. The method as set forth in claim 10, wherein the first wide planar layer of electrically conductive foil and the second wide planar layer of electrically conductive foil are formed of expanded copper foil material.

14. The method as set forth in claim 10, wherein the first interior surface of the aircraft and the second interior surface of the aircraft are formed of composite materials.

15. The method as set forth in claim 10, further comprising:

applying a third wide planar layer of electrically conductive foil over a third interior surface of the aircraft adjacent data and signal wires and between the nose portion of the aircraft and the tail portion of the aircraft; and electrically connecting the third wide planar layer of electrically conductive foil between the first wide planar layer of electrically conductive foil and the second wide planar layer of electrically conductive foil.

16. The method as set forth in claim 15, further comprising applying a layer of insulative material over the third wide planar layer of electrically conductive foil.

17. An internal current return network in an aircraft having a fuselage formed at least partially of composite materials, the fuselage having composite panels attached to frames and stringers, the aircraft further having data and signal wires connected to interior surfaces of the fuselage, the internal current return network comprising:

a first wide planar layer of electrically conductive foil placed over a first interior surface of the fuselage near a front portion of the aircraft, the first wide planar layer of electrically conductive foil covering interior surfaces of some of the panels, the frames, and the stringers and placed adjacent or underneath the data and signal wires;

a second wide planar layer of electrically conductive foil placed over a second interior surface of the fuselage near a rear portion of the aircraft, the second wide planar layer of electrically conductive foil covering interior surfaces of some of the panels, the frames, and the stringers and placed adjacent or underneath the data and signal wires; and an interconnecting layer of electrically conductive foil that connects the first wide planar layer of electrically conductive foil with the second wide planar layer of electrically conductive foil to create the internal current return network electrically continuously between the front portion of the aircraft and the rear portion of the aircraft.

* * * * *